(12) United States Patent
Chae (10) Patent No.: US 12,237,736 B2
(45) Date of Patent: Feb. 25, 2025

(54) DUAL ROTOR MOTOR

(71) Applicants: HYUNDAI MOTOR COMPANY, Seoul (KR); KIA CORPORATION, Seoul (KR)

(72) Inventor: Min Ho Chae, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 247 days.

(21) Appl. No.: 17/950,741

(22) Filed: Sep. 22, 2022

(65) Prior Publication Data

US 2023/0318422 A1 Oct. 5, 2023

(30) Foreign Application Priority Data

Mar. 30, 2022 (KR) .................. 10-2022-0039506

(51) Int. Cl.
*H02K 16/02* (2006.01)
*H02K 1/14* (2006.01)
*H02K 49/10* (2006.01)

(52) U.S. Cl.
CPC .............. *H02K 16/02* (2013.01); *H02K 1/148* (2013.01)

(58) Field of Classification Search
CPC ........ H02K 16/02; H02K 1/148; H02K 49/10; H02K 49/102
USPC ........................................................ 310/114
See application file for complete search history.

(56) References Cited

U.S. PATENT DOCUMENTS

| | | | | |
|---|---|---|---|---|
| 6,924,574 B2 * | 8/2005 | Qu | ......................... | H02K 21/12 310/112 |
| 7,253,548 B2 * | 8/2007 | Dooley | ................ | H02K 21/028 310/191 |
| 7,567,006 B2 * | 7/2009 | Ichiyama | ............. | H02K 21/029 310/156.55 |
| 8,089,191 B2 * | 1/2012 | Hao | ..................... | H02K 21/028 318/538 |
| 8,207,648 B2 | 6/2012 | Li et al. | | |
| 8,536,752 B2 * | 9/2013 | Katsumata | ........... | H02K 21/028 310/156.01 |
| 8,754,568 B2 | 6/2014 | Kim et al. | | |
| 8,987,962 B2 | 3/2015 | Kim | | |
| 11,606,011 B2 * | 3/2023 | Zatorski | ............... | H02K 7/1823 |
| 2007/0236095 A1 * | 10/2007 | Caiozza | ................. | H02K 23/68 310/154.49 |
| 2021/0036591 A1 | 2/2021 | Ryu et al. | | |

FOREIGN PATENT DOCUMENTS

| | | | | |
|---|---|---|---|---|
| JP | 2004336915 A | * | 11/2004 | ............. H02K 16/02 |
| JP | 4069796 B2 | | 4/2008 | |
| JP | 2011155740 A | | 8/2011 | |
| KR | 20100085057 A | | 7/2010 | |

(Continued)

OTHER PUBLICATIONS

Nakayama JP2004336915 JPO Fulltext English Machine Translation (Year: 2004).*

*Primary Examiner* — Burton S Mullins
(74) *Attorney, Agent, or Firm* — Lempia Summerfield Katz LLC (57) ABSTRACT

The present disclosure comprises an inner rotor and an outer rotor, a stator disposed between the inner rotor and the outer rotor, and a variable stator core provided to control a magnetic path between inside and outside of the stator.

10 Claims, 6 Drawing Sheets

(56) References Cited

FOREIGN PATENT DOCUMENTS

| | | | |
|---|---|---|---|
| KR | 20110139434 | A | 12/2011 |
| KR | 20130025141 | A | 3/2013 |
| KR | 20190074957 | A | 6/2019 |
| KR | 102016250 | B1 | 8/2019 |

* cited by examiner

DUAL ROTOR MOTOR

CROSS REFERENCE TO RELATED APPLICATION

The present application claims priority to Korean Patent Application No. 10-2022-0039506, filed Mar. 30, 2022, the entire contents of which are incorporated herein for all purposes by this reference.

BACKGROUND

Field of the Disclosure

The present disclosure relates to a structure of a dual-rotor motor.

Description of the Related Art

The dual-rotor motor is a motor in which rotors are arranged on both sides of inner and outer circumferences of the stator so that the inner rotor inside the stator and the outer rotor outside the stator may rotate independently of each other.

Therefore, the stator to independently operate the inner rotor and the outer rotor is provided with slots in the inner and outer circumference surfaces, respectively. The stator has a structure such that each coil is wound by using these slots.

The foregoing is intended merely to aid in the understanding of the background of the present disclosure. The foregoing is not intended to mean that the present disclosure falls within the purview of the related art that is already known to those having ordinary skill in the art.

SUMMARY

Therefore, it is an object of the present disclosure to provide a dual-rotor motor configured to vary a connection state of a magnetic path of the dual-rotor motor, so that when an inner rotor and an outer rotor are at the same speed, the length of the magnetic path is shortened, and the reluctance is lowered. Thus, the torque density may be improved.

To accomplish the above object, a dual-rotor motor includes: an inner rotor and an outer rotor; a stator disposed between the inner rotor and the outer rotor; and a variable stator core provided to control a magnetic path between inside and outside of the stator.

The stator is disposed so that inner teeth facing the inner rotor and outer teeth facing the outer rotor are aligned in a radial direction. The variable stator core may be provided to control the magnetic path between the inner teeth and the outer teeth.

As the variable stator core moves between a first space, which is formed between an outer slot and an inner slot of the stator, and a second space, which is formed between the outer teeth and the inner teeth, the variable stator core may be provided to control the magnetic path between the inner teeth and the outer teeth.

The variable stator core is configured to have the same width as a radial width of the second space. The first space is configured to have a larger width than the radial width of the second space.

The first space is provided with a recess portion recessed further towards inside of the radial direction than the second space. The first space may be configured to have a larger radial width than the second space.

The variable stator core may be installed to reciprocate between the recess portion of the first space and the second space.

At least one side of the stator is provided with a guide plate guiding a movement of the variable stator core. The variable stator core is provided with a guide protrusion penetrating the guide plate to be guided to the guide plate. A carrier is installed so that the variable stator core can apply a force to the guide protrusion to reciprocate between the recess portion of the first space and the second space.

The carrier may be formed in a ring shape that is rotated about a rotational axis of the motor to link a plurality of guide protrusions. The dual-rotor motor may further include an actuator formed so as to allow the carrier to rotate about the rotational axis of the motor.

The actuator is configured to be installed by a controller controlling the motor. The controller may be configured to position the variable stator core in the recess portion of the first space when the inner rotor and the outer rotor rotate independently of each other. The controller may be configured to control the actuator to position the variable stator core in the second space when the inner rotor and the outer rotor rotate at the same speed as each other.

The variable stator core may include: a core housing having the guide protrusion; and a laminated core laminating a plurality of grain-oriented silicon steel sheets so as to be inserted into the core housing.

The grain-oriented silicon steel sheets of the laminated core may be laminated by positioning the variable stator core in the second space, so that when the outer teeth and the inner teeth are connected in a radial direction, the grain-oriented silicon steel sheets of the laminated core are laminated such that the reluctance is minimized.

The variable stator core may be configured to: block the magnetic path between the inside and outside of the stator when the inner rotor and the outer rotor rotate independently of each other; and connect the magnetic path between the inside and the outside of the stator when the inner rotor and the outer rotor rotate at the same speed as each other.

The variable stator core may be configured to connect the magnetic path between the inner teeth and the outer teeth aligned along the radial direction of the stator when the inner rotor and the outer rotor rotate at the same speed as each other.

The variable stator core may be configured to be positioned between the inner slot and the outer slot aligned to each other along the radial direction of the stator when the inner rotor and the outer rotor rotate independently of each other. The stator provides a space that forms the blocked state of the magnetic path between the inside and the outside even when the variable stator core is positioned between the inner slot and the outer slot.

The present disclosure provides a dual-rotor motor configured to vary a connection state of a magnetic path of the dual-rotor motor, so that when an inner rotor and an outer rotor rotate at the same speed, the length of the magnetic path is shortened, and the reluctance is lowered. Thus, the torque density may be improved.

DETAILED DESCRIPTION

Regarding embodiments of the present inventive concept disclosed in this specification or application, the specific structural or functional description is merely illustrative for the purpose of describing the embodiments of the disclosure. Embodiments of the disclosure may be implemented in various forms but should not be construed as being limited to the embodiments set forth in this specification or application.

Because the embodiments of the disclosure may be variously modified and have various forms, specific embodiments are illustrated in the drawings and described in detail in this specification or application. However, it should be understood that embodiments of the disclosure are intended not to be limited to the specific embodiments but to cover all modifications, equivalents, or alternatives without departing from the spirit and technical scope of the present disclosure.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component.

It should be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. Other expressions describing relationships between components such as "between", "immediately between" or "adjacent to" and "directly adjacent to" may be construed similarly.

When a component, device, element, or the like of the present disclosure is described as having a purpose or performing an operation, function, or the like, the component, device, or element should be considered herein as being "configured to" meet that purpose or to perform that operation or function.

The terms used in the present specification are merely used to describe specific embodiments and are not intended to limit the present disclosure. As used herein, the singular form is intended to include the plural forms as well, unless context clearly indicates otherwise. In the present application, it should be further understood that the terms "comprises," "includes," and the like specify the presence of stated features, integers, steps, operations, elements, components, or combinations thereof. However, these terms do not preclude the presence or addition of one or more other features, integers, steps, operations, elements, components, or combinations thereof.

Unless defined otherwise, all technical and scientific terms used herein have the same meaning as commonly understood by one of ordinary skill in the art to which this inventive concept belongs. It should be further understood that terms defined in commonly used dictionaries should be interpreted as having a meaning that is consistent with their meaning in the context of the related art and should not be interpreted in an idealized or overly formal sense unless expressly so defined herein.

Hereinafter, embodiments of the present disclosure are described in greater detail with reference to the accompanying drawings. Like numerals refer to like elements throughout.

Figure 1:
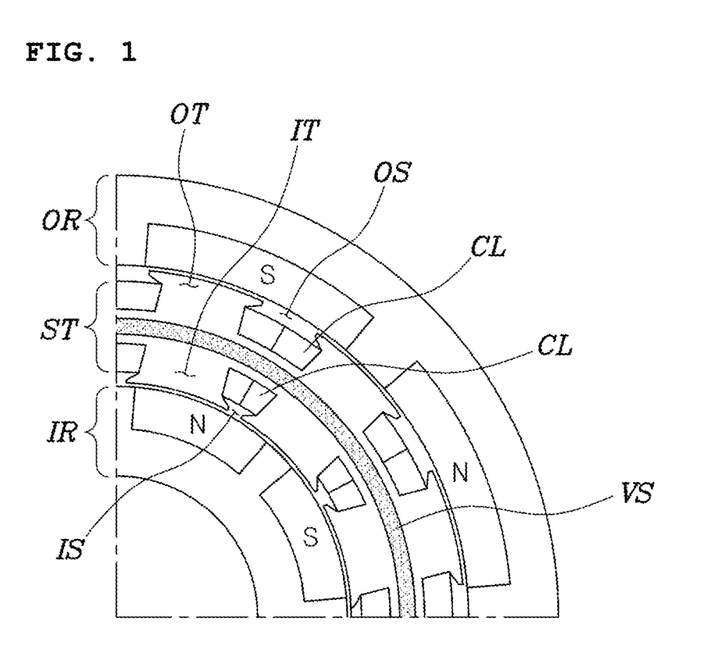
FIG. 1 is a first conceptual view of a dual-rotor motor according to the present disclosure.

In FIG. 1, a dual-rotor motor of the present disclosure comprises: an inner rotor IR and an outer rotor OR; a stator ST disposed between the inner rotor IR and the outer rotor OR; and a variable stator core VS provided to control a magnetic path between the inside and outside of the stator ST.

The variable stator core VS blocks the magnetic path between the inside and the outside of the stator ST when the inner rotor IR and the outer rotor OR rotate independently of each other. The variable stator core VS connects the magnetic path between the inside and the outside of the stator ST when the inner rotor IR and the outer rotor OR rotate at the same speed.

In other words, according to the present disclosure, by configuring a state of magnetic pathway connection between the inside and the outside of the stator ST to be varied by the variable stator core VS, and when the inner rotor IR and the outer rotor OR rotate independently of each other, the magnetic path formed by the stator ST with the outer rotor OR on the outside of the stator ST and the magnetic path formed by the stator ST with the inner rotor IR on the inside of the stator ST are configured to block independently of each other.

When the inner rotor IR and the outer rotor OR rotate at the same speed as each other, by connecting the integrated magnetic path in which the inside and outside of the stator ST are connected to each other, the total length of the magnetic path formed between the stator ST, the inner rotor IR, and the outer rotor OR can be shortened and the reluctance can be lowered, thereby improving the torque density.

The variable stator core VS, as shown in FIG. 1, may be configured by utilizing a space formed between the inside and the outside of the stator ST.

As mentioned above, in a state where the space formed in the stator ST is filled with a non-magnetic material such as air, the magnetic path between the inside and the outside of the stator ST is blocked from each other, while the magnetic path between the inside and the outside of the stator ST is connected to each other in a state where the space is filled with magnetic material. Therefore, by injecting or discharging a liquid magnetic material into the space of the stator ST, the variable stator core VS can be configured to connect the magnetic path between the inside and the outside of the stator ST.

For reference, permanent magnets are disposed on the inner rotor IR and the outer rotor OR, respectively and are denoted by N and S, indicating two magnetic poles of the permanent magnets in diagrams.

Figure 2:
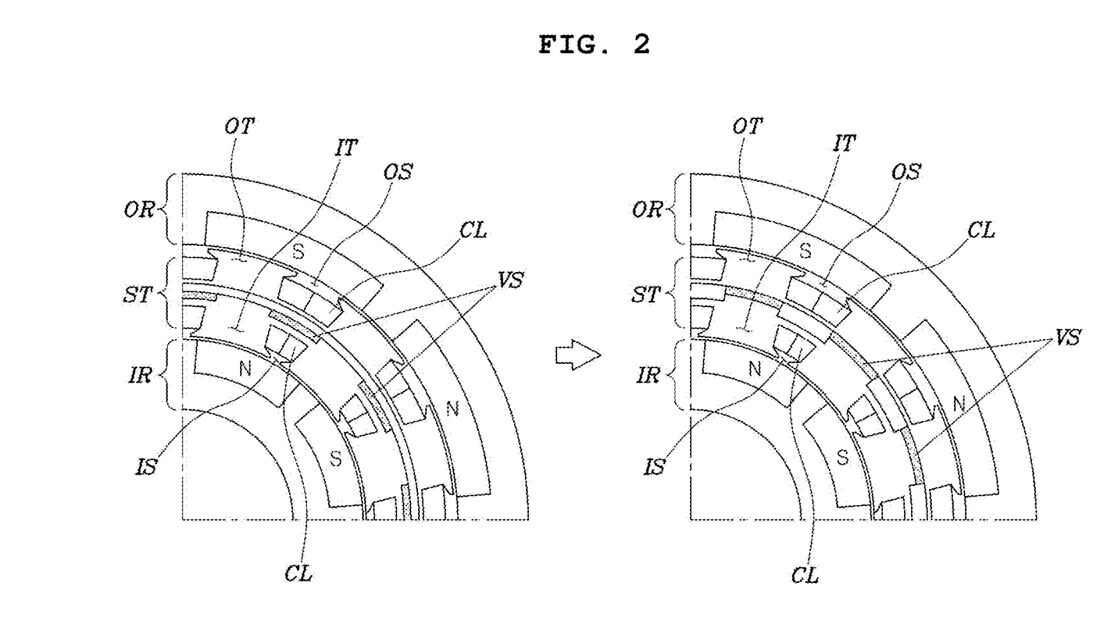
FIG. 2 is a second conceptual view of a dual-rotor motor according to the present disclosure.

FIG. 2 is a conceptual view that configures the variable stator core VS in a different method, as mentioned above.

In the stator ST, inner teeth IT that face the inner rotor IR and outer teeth OT that face the outer rotor OR are aligned in a radial direction, so that an inner slot IS between the inner teeth IT and an outer slot OS between the outer teeth OT are aligned with each other in the radial direction.

Of course, in the inner slot IS and the outer slot OS, a wound coil CL may be positioned on the inner teeth IT and the outer teeth OT, respectively.

For reference, the radial direction refers to a radial direction with respect to a rotational axis of the motor.

The variable stator core VS is provided to control the magnetic path between the inner teeth IT and the outer teeth OT.

Figure 4:
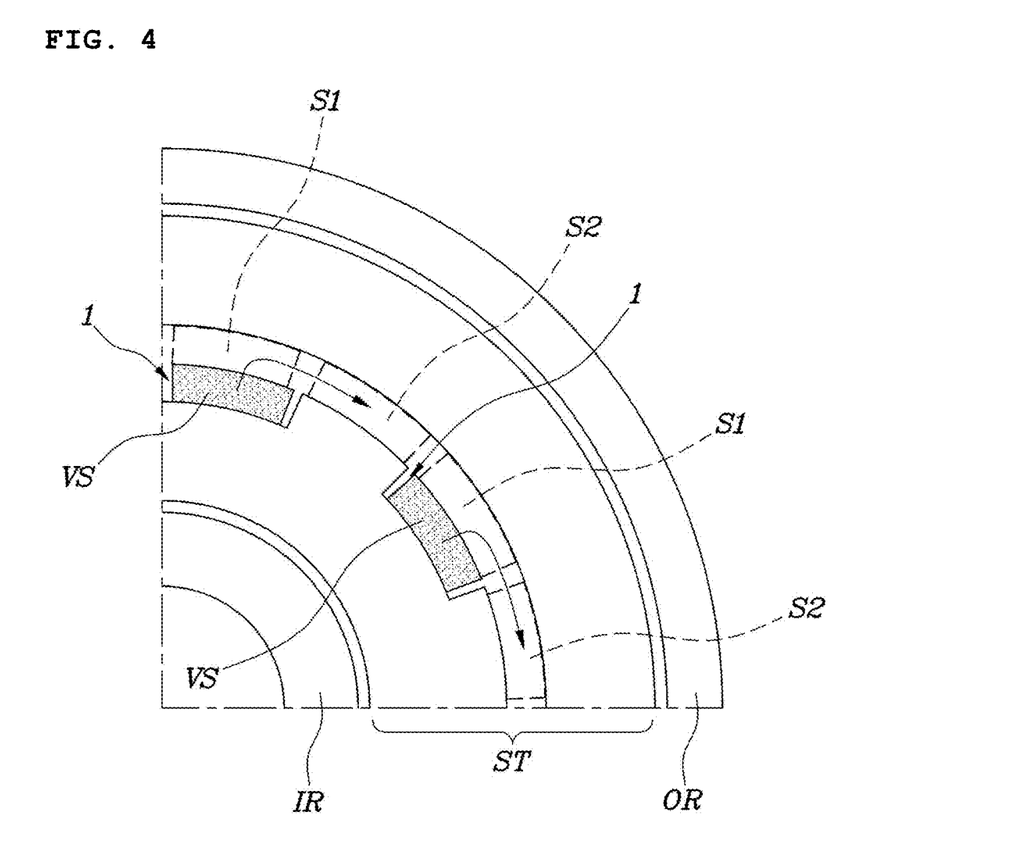
FIG. 4 is a cross-sectional view taken along line IV-IV of FIG. 3.

With reference to FIGS. 2 and 4, as the variable stator core VS moves between a first space S1, which is formed between the outer slot OS and the inner slot IS of the stator ST, and a second space S2, which is formed between the outer teeth OT and the inner teeth IT, the variable stator core VS is provided to control the magnetic path between the inner teeth IT and the outer teeth OT.

In other words, when the variable stator core VS, as shown on the left side of FIG. 2, is positioned in the first space S1 between the inner slot IS and the outer slot OS, the second space S2 between the inner teeth IT and the outer teeth OT is filled with empty space or air to have a non-magnetic property, the magnetic path between the inner teeth IT and the outer teeth OT is in a blocked state.

In addition, when the variable stator core VS, as shown on the right side of FIG. 2, is positioned in the second space S2, the magnetic path between the inner teeth IT and the outer teeth OT may be connected by the variable stator core VS.

In this case, the magnetic path formed on the inner rotor IR side and the magnetic path formed on the outer rotor OR side are connected to each other through the inner teeth IT and the outer teeth OT to form a closed magnetic path entirely. Accordingly, compared to when the magnetic path formed between the stator ST and the inner rotor IR and the magnetic path formed between the stator ST and the outer rotor OR form a closed magnetic path independently of each other, the length of the entire magnetic path is shortened, the reluctance is lowered, and ultimately the torque density of the motor is improved.

In other words, when the inner rotor IR and the outer rotor OR rotate at the same speed, the variable stator core VS is provided to connect between the inner teeth IT and the outer teeth OT that are aligned along the radial direction of the stator ST.

The variable stator core VS is configured to have the same width as a radial width of the second space S2, and the first space S1 to have a width greater than the radial width of the second space S2.

The variable stator core VS to have the same width as the radial width of the second space S2 means that the variable stator core VS is inserted into the second space S2 and acting maximally to connect the magnetic path between the inner teeth IT and the outer teeth OT to have a width to ensure that there is merely no gap. Effectively, the width of the variable stator core VS may be narrower than the width of the second space S2 to the extent that the movement of the variable stator core VS is allowed.

The first space S1 is provided with a recess portion 1 recessed further towards the radial direction internally than the second space S2 and may be configured to have a larger radial width than the second space S2.

Accordingly, in a state, shown on the left side of FIG. 2, where the variable stator core VS is positioned in the recess portion 1 of the first space S1, like the inner teeth IT and outer teeth OT, the magnetic path between the inner slot IS and the outer slot OS is blocked, so that a mutually independent operation of the inner rotor IR and the outer rotor OR may be reliably performed.

In other words, when the inner rotor IR and the outer rotor OR rotate independently of each other, the variable stator core VS is configured to be positioned between the inner slot IS and the outer slot OS that are aligned to each other along the radial direction of the stator ST. The stator ST is configured to provide a space that forms a state where outside and inside of the magnetic path are blocked, even when the variable stator core VS is positioned between the inner slot IS and the outer slot OS.

FIGS. 3-6 are views showing more specific embodiments capable of implementing the same operation, wherein the variable stator core VS may be installed to reciprocate between the recess portion 1 of the first space S1 and the second space S2.

Figure 3:
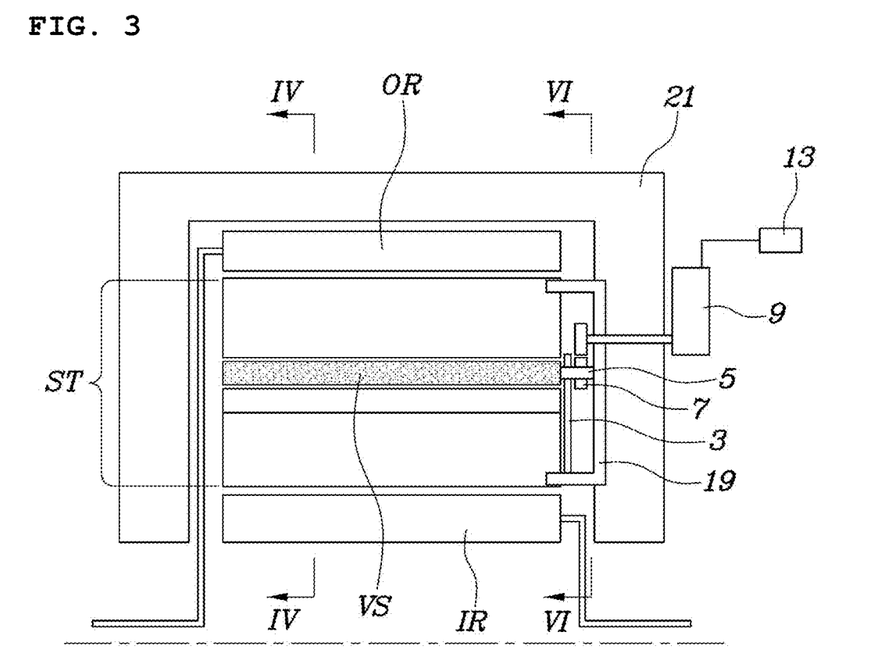
FIG. 3 is a view showing an embodiment of a dual-rotor motor according to the second concept of FIG. 2, which is a cross-sectional structural view of a motor in a rotational axis direction.
Figure 6:
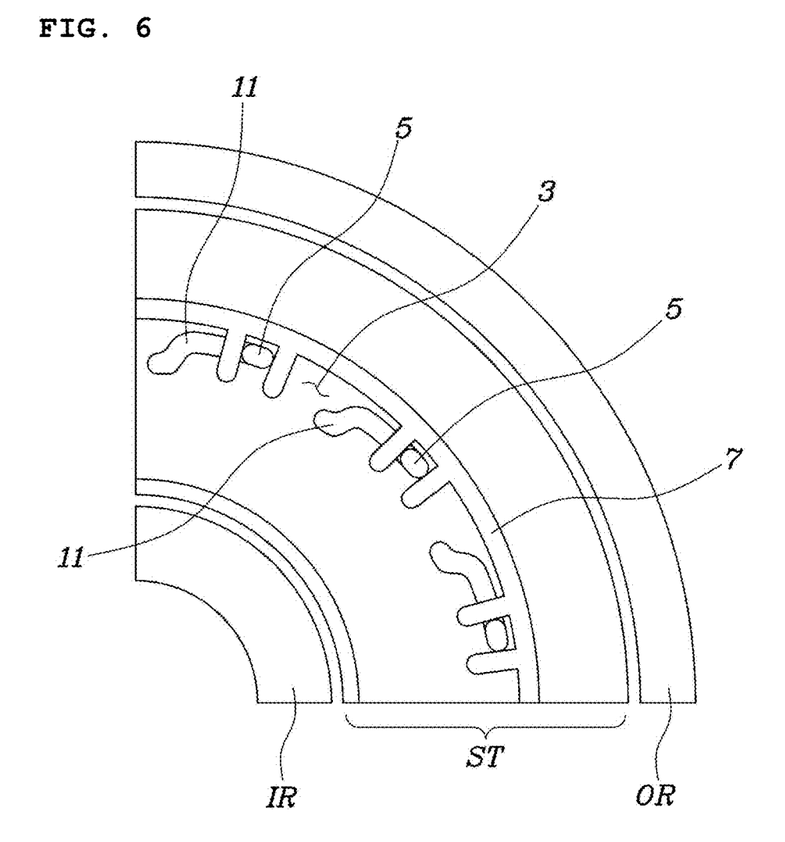
FIG. 6 is a cross-sectional view taken along line VI-VI of FIG. 3.

At least one side of the stator ST is provided with a guide plate 3 guiding a movement of the variable stator core VS. The variable stator core VS is provided with a guide protrusion 5 penetrating the guide plate 3 to be guided to the guide plate 3. A carrier 7 is installed so that the variable stator core VS can apply a force to the guide protrusion 5 to reciprocate between the recess portion 1 of the first space S1 and the second space S2.

In addition, the carrier 7 is formed in a ring shape that is rotated about the rotational axis of the motor so as to link a plurality of guide protrusions 5. The motor may include an actuator 9 formed so as to allow the carrier 7 to rotate about the rotational axis of the motor.

Accordingly, when the carrier 7 is rotated by the actuator 9, the plurality of guide protrusions 5 move along a guide groove 11 formed on the guide plate 3 respectively by the carrier 7, so that a plurality of variable stator cores VS are configured to be in a state where the recess portion 1 of the first space S1 is positioned in the plurality of variable stator cores VS, or positioned in the second space S2, respectively.

The actuator 9 is installed (i.e., configured) to be controlled by a controller 13, which controls the motor. The controller 13 is configured to position the variable stator core VS in the recess portion 1 of the first space S1 when the inner rotor IR and the outer rotor OR rotate independently of each other. When the inner rotor IR and the outer rotor OR rotate at the same speed, the actuator 9 is configured to control positioning of the variable stator core VS in the second space S2.

For reference, in FIG. 3, the stator ST is fixed to a motor housing 21 by a fixing member 19, the output shaft of the inner rotor IR is on the right side, and the output shaft of the outer rotor OR is on the left side, which is denoted as extended.

In addition, in FIG. 4, the arrows indicate a path that the variable stator core VS moves from the recess portion 1 of the first space S1 to the second space S2.

Figure 5:
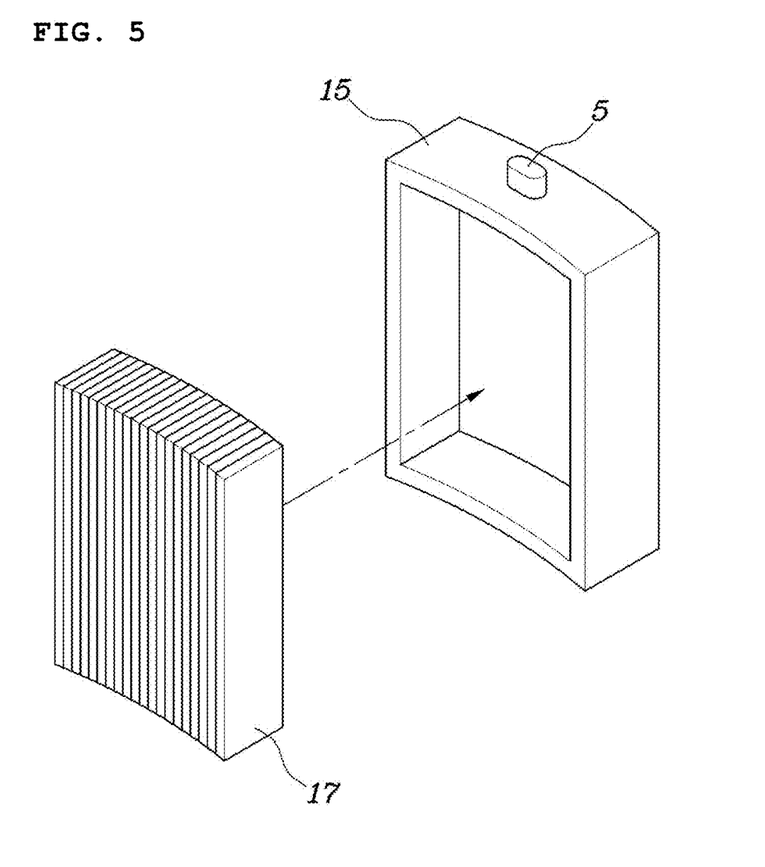
FIG. 5 is a view illustrating a structure of the variable stator core of FIG. 3.

On the other hand, the variable stator core VS, as shown in FIG. 5, includes a core housing 15 provided with the guide protrusion 5 and includes a laminated core 17 formed by laminating a plurality of grain-oriented silicon steel sheets to be inserted into the core housing 15.

The laminated core 17 formed by laminating the plurality of grain-oriented silicon steel sheets is provided in the core housing 15 to ensure the mechanical stability of the laminated core 17 and ensure the connectivity of the guide protrusion 5 and the laminated core 17.

The grain-oriented silicon steel sheets of the laminated core 17 may be laminated by positioning the variable stator core VS in the second space S2, so that when connecting the outer teeth OT and the inner teeth IT in a radial direction, the grain-oriented silicon steel sheets of the laminated core 17 are laminated such that the reluctance is minimized.

Therefore, when the variable stator core VS is positioned between the outer teeth OT and the inner teeth IT, the magnetic path passing through the outer teeth OT and the inner teeth IT may allow for a connection such that the reluctance is minimized, ultimately contributing to improve the torque density of the motor.

Although the embodiments of the present disclosure have been disclosed for illustrative purposes, those having ordinary skill in the art should appreciate that various modifications, additions, and substitutions are possible, without departing from the scope and spirit of the disclosure as disclosed in the accompanying claims.

What is claimed is:

1. A dual-rotor motor comprising:
an inner rotor and an outer rotor;
a stator disposed between the inner rotor and the outer rotor; and
a variable stator core provided to control a magnetic path between inside and outside of the stator,
wherein the stator is disposed so that inner teeth facing the inner rotor and outer teeth facing the outer rotor are aligned in a radial direction,
wherein as the variable stator core moves between a first space, which is formed between an outer slot and an inner slot of the stator, and a second space, which is formed between the outer teeth and the inner teeth, the variable stator core is provided to control the magnetic path between the inner teeth and the outer teeth,
wherein the first space is provided with a recess portion recessed further towards inside of the radial direction than the second space, and
wherein the variable stator core is installed to reciprocate between the recess portion of the first space and the second space along a path that allows both radial and circumferential displacement.

2. The dual-rotor motor of claim 1, wherein the variable stator core is configured to have a same width as a radial width of the second space, and the first space is configured to have a larger width than the radial width of the second space.

3. The dual-rotor motor of claim 1, wherein at least one side of the stator is provided with a guide plate guiding a movement of the variable stator core, the variable stator core is provided with a guide protrusion penetrating the guide plate to be guided to the guide plate, and a carrier is installed so that the variable stator core applies a force to the guide protrusion to reciprocate between the recess portion of the first space and the second space.

4. The dual-rotor motor of claim 3, wherein the carrier is formed in a ring shape that is rotated about a rotational axis of the motor to link a plurality of guide protrusions, and wherein the dual-rotor motor further comprises an actuator formed to allow the carrier to rotate about the rotational axis of the motor.

5. The dual-rotor motor of claim 4, wherein the actuator is installed to be controlled by a controller which controls the motor,
wherein the controller is configured to:
position the variable stator core in the recess portion of the first space when the inner rotor and the outer rotor rotate independently of each other; and
control the actuator to position the variable stator core in the second space when the inner rotor and the outer rotor rotate at the same speed as each other.

6. The dual-rotor motor of claim 3, wherein the variable stator core comprises:
a core housing having the guide protrusion; and
a laminated core laminating a plurality of grain-oriented silicon steel sheets so as to be inserted into the core housing.

7. The dual-rotor motor of claim 6, wherein a grain-oriented silicon steel sheet of the plurality of grain-oriented silicon steel sheets of the laminated core is laminated by positioning the variable stator core in the second space, so that when the outer teeth and the inner teeth are connected in a radial direction, the grain-oriented silicon steel sheet of the plurality of grain-oriented silicon steel sheets of the laminated core is laminated such that the reluctance is minimized.

8. A dual-rotor motor comprising:
an inner rotor and an outer rotor;
a stator disposed between the inner rotor and the outer rotor; and
a variable stator core provided to control a magnetic path between inside and outside of the stator,
wherein the variable stator core is configured to block the magnetic path between the inside and the outside of the stator when the inner rotor and the outer rotor rotate independently of each other, and wherein the variable stator core is further configured to connect the magnetic path between the inside and the outside of the stator when the inner rotor and the outer rotor rotate at the same speed as each other.

9. The dual-rotor motor of claim 8, wherein the variable stator core is configured to connect the magnetic path between the inner teeth and the outer teeth aligned along the radial direction of the stator when the inner rotor and the outer rotor rotate at the same speed as each other.

10. The dual-rotor motor of claim 9, wherein the variable stator core is configured to be positioned between an inner slot and an outer slot aligned to each other along the radial direction of the stator when the inner rotor and the outer rotor rotate independently of each other, and wherein the stator provides a space that forms a blocked state of the magnetic path between the inside and the outside even when the variable stator core is positioned between the inner slot and the outer slot.

* * * * *